United States Patent [19]

Bader et al.

[11] 4,288,782
[45] Sep. 8, 1981

[54] HIGH SPEED CHARACTER MATCHER AND METHOD

[75] Inventors: Ronald S. Bader; Lyle V. Rennick, both of Cupertino; Robert H. Wallis, Portola Valley, all of Calif.

[73] Assignee: Compression Labs, Inc., Cupertino, Calif.

[21] Appl. No.: 69,258

[22] Filed: Aug. 24, 1979

[51] Int. Cl.³ .............................................. G06K 9/68
[52] U.S. Cl. ................. 340/146.3 Q; 340/146.3 MA
[58] Field of Search ............. 340/146.3 H, 146.3 MA, 340/146.3 S, 146.3 T, 146.3 Q, 146.3 AQ

[56] References Cited

U.S. PATENT DOCUMENTS

| | | | |
|---|---|---|---|
| 3,339,179 | 8/1967 | Shelton, Jr. et al. | 340/146.3 H |
| 3,341,814 | 9/1967 | Chow | 340/146.3 S |
| 3,576,534 | 4/1971 | Steinberger | 340/146.3 Q |
| 3,706,071 | 12/1972 | Gray | 340/146.3 MA |
| 3,905,018 | 9/1975 | Gray | 340/146.3 Q |
| 4,153,897 | 5/1979 | Yasuda et al. | 340/146.3 Q |
| 4,200,861 | 4/1980 | Hubach et al. | 340/146.3 MA |

OTHER PUBLICATIONS

Widrow, "The Rubber-Mask Technique-I. Pattern Measurement and Analysis" *Pattern Recognition*, 1973, vol. 5, pp. 175-197, Pergamon Press.
Widrow, "The Rubber-Mask Technique-II. Pattern Storage and Recognition" *Pattern Recognition*, 1973, vol. 5, pp. 199-211, Pergamon Press.

*Primary Examiner*—Leo H. Boudreau
*Attorney, Agent, or Firm*—Flehr, Hohbach, Test, Albritton & Herbert

[57] ABSTRACT

A high speed character matcher and method for measuring the similarity between a pair of binary patterns representing two-dimensional images. The patterns are compared on a bit by bit basis and when a discrepancy is detected, it is assigned an error penalty which is based on the two-dimensional context in which the error occurred. The types of error context which are typical in the comparison of distorted but otherwise similar characters are given a lower error than those typically encountered in the comparison of dissimilar characters.

13 Claims, 6 Drawing Figures

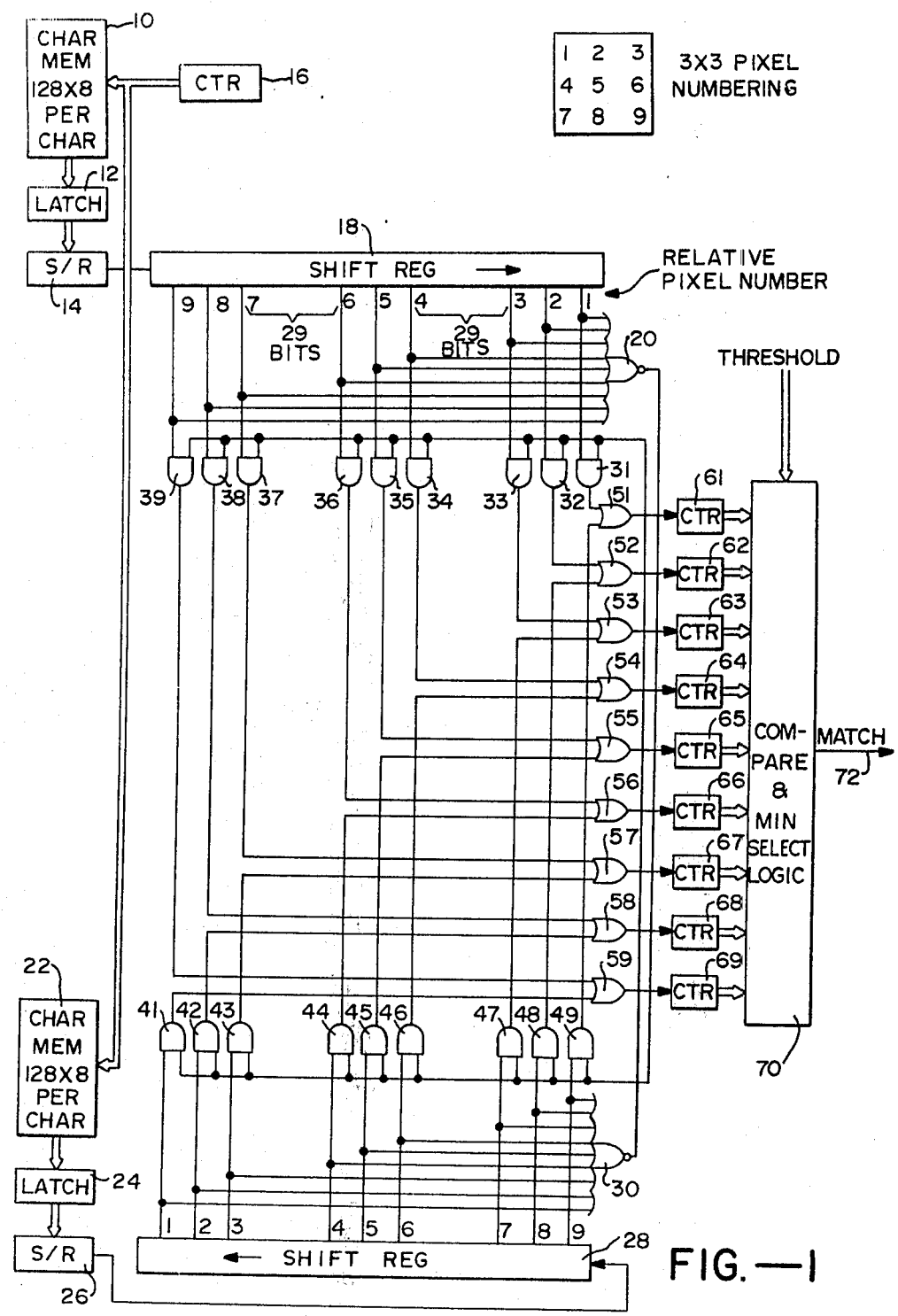
FIG.—1

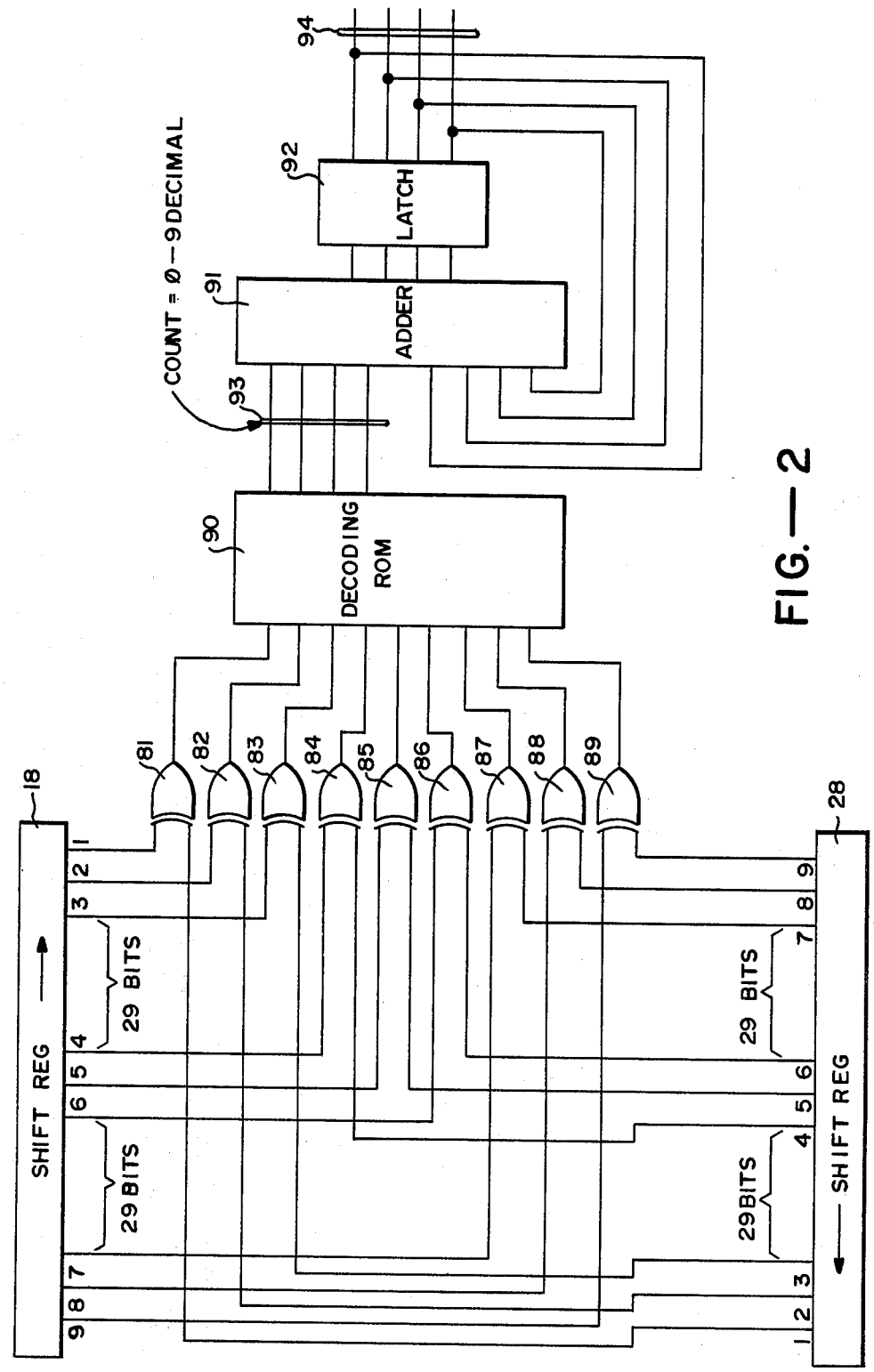
FIG.—2

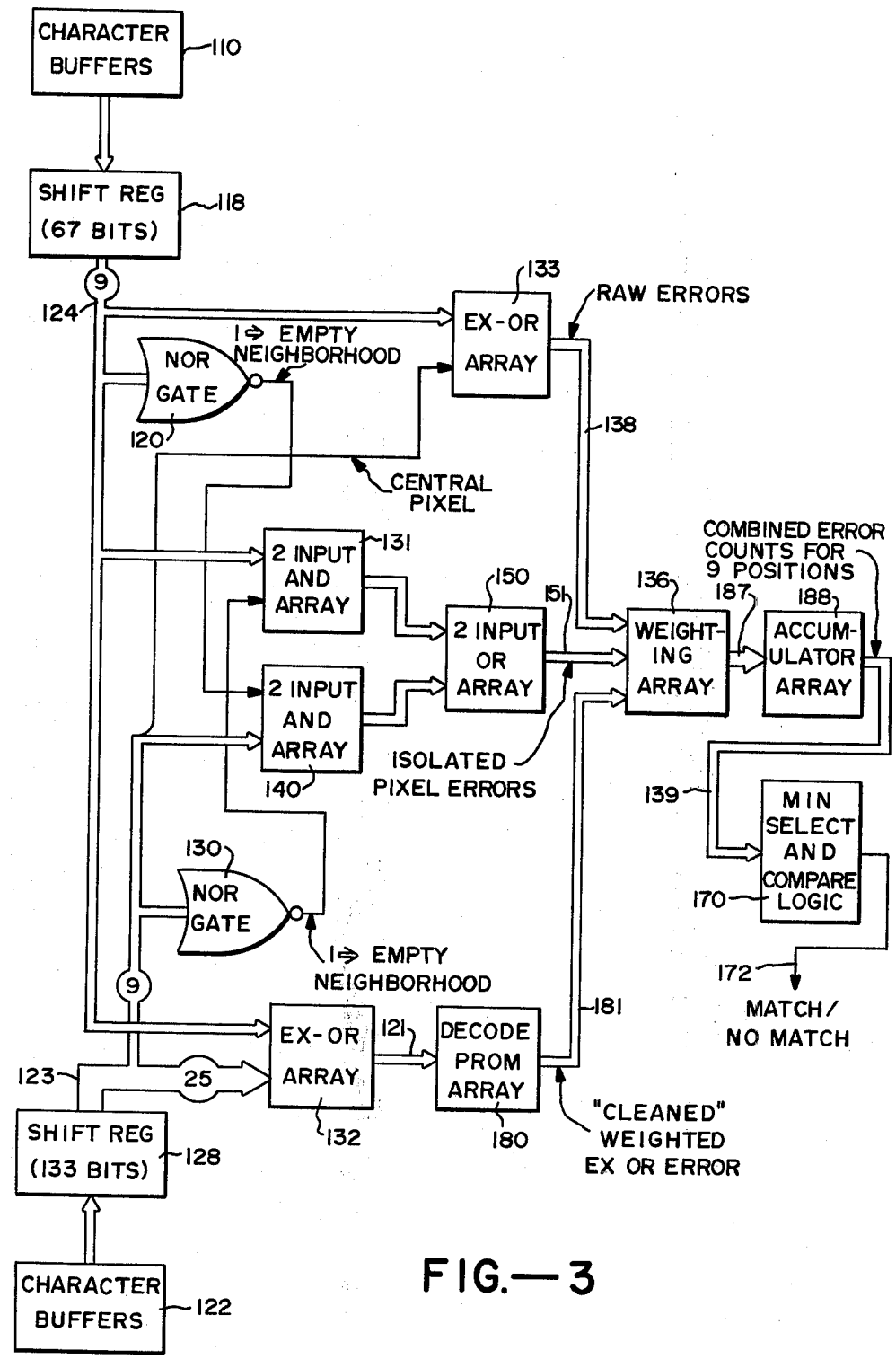
FIG.—3

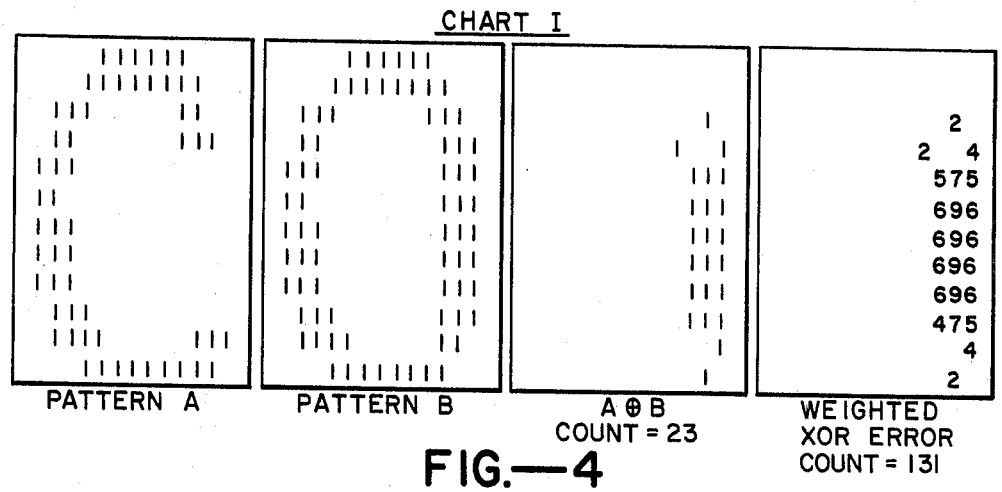
FIG.—4
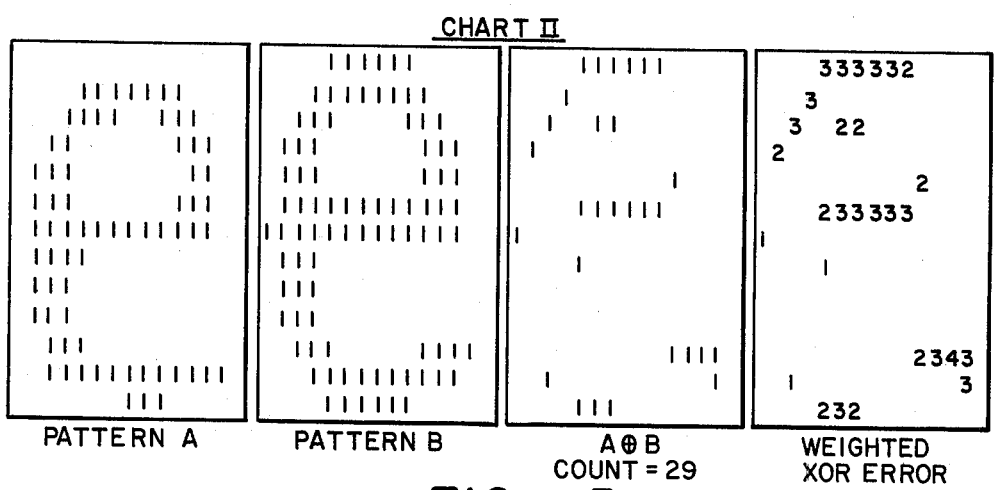
FIG.—5
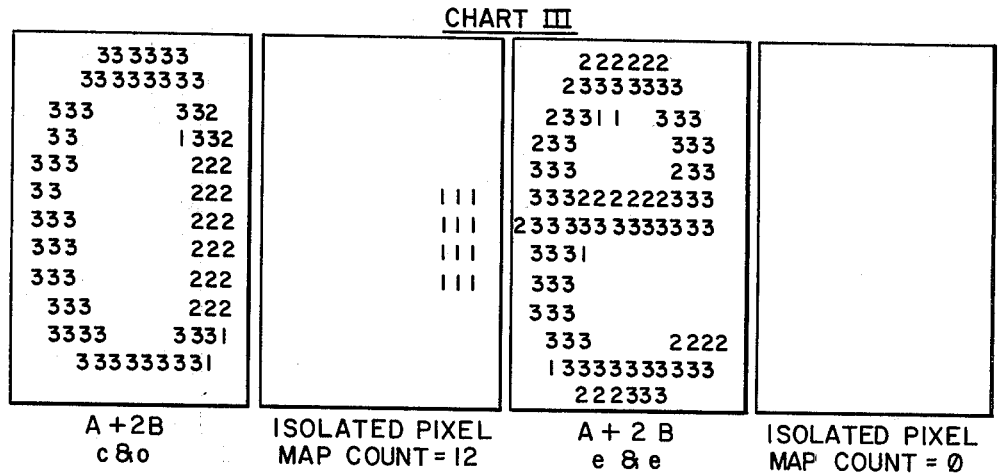
FIG.—6

HIGH SPEED CHARACTER MATCHER AND METHOD

BACKGROUND OF THE INVENTION

The present invention relates to a high speed character matcher and method.

In the fields of optical character recognition, facsimile compression and image correlation, it is necessary to determine the degree of similarity between characters. The characters are typically represented by a pattern of digital picture elements (pixels). In order to determine whether a pair of characters are similar enough to declare a match, a comparison is performed upon the pattern of pixels.

One prior art approach, known as the "raw exclusive-OR" error, utilizes a template or pattern matcher which calculates the degree of similarity between a pair of patterns by summing the number of elements for which the patterns are unequal. This technique is usually normalized in such a way as to make it invariant to the size of the patterns being compared. A major problem with such a prior art template matcher is that it treats all errors alike regardless of where they occurred.

Another prior art approach, known as the "rubber mask" technique, attempts to match a pair of patterns by geometrically distorting one pattern so as to achieve geometrical conformity with the other. This prior art technique is ambitious in that it attempts to compensate for large distortions by actually warping one template or pattern to fit the other. While the "rubber mask" technique can deal with severe distortion, because of its complexity, it is quite difficult to implement in high speed digital hardware.

Therefore, there is a need for an improved character matcher and method that can be easily implemented into high speed digital hardware.

In view of the above background, it is an objective of the present invention to provide an improved high speed character matcher and method for use in the fields of optical character recognition, facsimile compression and image correlation.

SUMMARY OF THE INVENTION

The present invention relates to a high speed character matcher and method.

In accordance with one objective of the present invention, a method is used to measure the similarity between a pair of digital patterns representing two-dimensional images and is especially useful in the recognition of printed characters. The patterns are compared on a bit by bit basis, and when a discrepancy is detected, it is assigned an error penalty which is based on the two-dimensional context in which the error occurred. The types of error context which are typical in the comparison of distorted but otherwise similar characters are given a lower error than those typically encountered in the comparison of dissimilar characters. This provides improved matching performance in that the method and apparatus are less affected by small rotations and variations in line thickness than conventional template matching procedures.

The method includes the steps of storing digital pixel data representing, respectively, first and second characters to be compared, forming for each pixel of said first and second characters an array of predetermined size where each pixel becomes the center element of its respective array and is surrounded by its nearest neighboring pixels.

The method further includes the steps of determining whether each center pixel in the first character is in a first state (e.g., a digital "1") and whether any pixel in the corresponding array of the second character is in a second state (e.g., a digital "0"). Control signals are generated for each corresponding pixel in the second state, which represent a measure of the degree of similarity between the first and second characters. The respective control signals are compared with a predetermined threshold value and a determination is made whether the first and second characters are sufficiently close to be declared a match.

In accordance with the above summary, the present invention achieves the objective of providing an improved high speed character matcher and method for use in the fields of optical character recognition, facsimile compression and image correlation.

Other objects and features of the present invention will become apparent from the following detailed description when taken in conjunction with the accompanying drawings.

BRIEF DESCRIPTION OF THE DRAWINGS

FIGS. 1 and 2 depict schematic diagrams of a high speed character matcher utilizing an isolated error criterion and a cleaned exclusive-OR criterion, respectively, according to the present invention.

FIG. 3 depicts a block diagram of a high speed character matcher utilizing a combination of an isolated error, cleaned error and raw error criteria according to the present invention.

FIGS. 4-6 depict charts for illustrating the operation of the character matcher of FIG. 1.

DESCRIPTION OF THE DRAWINGS

Consider a two-dimensional binary pattern represented by:

$$A (COL, ROW)$$

with $$COL = 1, 2, \ldots, NCOL$$

$$ROW = 1, 2, \ldots, NROW \qquad [1]$$

The binary pattern may be mapped into a one-dimensional array by cycling through the first dimension (COL) most quickly, giving A(I) where $$I = (ROW-1) * NCOL + COL \qquad [2]$$

FOR $$I = 1, 2, 3, \ldots, N \text{ and}$$

$$N = (NCOL) * (NROW) \qquad [3]$$

As described previously, a conventional template or pattern matcher calculates the similarity between a pair of patterns A(I) and B(I) by summing the number of coordinates for which A and B are unequal. The algorithm may be described as $$\text{ERROR} = \sum_{I=1}^{N} A(I) \oplus B(I) \quad [4]$$

where $\oplus$ denotes the Boolean "exclusive-OR"

The above error is usually normalized in such a way as to make it invariant to the size of the patterns being compared.

A major shortcoming of such conventional pattern matching described above is that it treats all errors alike regardless of where they occur. It would be desirable to provide a method which utilizes an error criterion based upon the context in which the error occurred rather than treating all errors with the same weight. The improved matcher, to be described, utilizes two alternative error criteria that are based on the context in which the error occurred. The two criteria are the (1) "Weighted" or "Cleaned Exclusive-OR Count" and the (2) "Isolated Pixel Count."

Weighted Exclusive OR Count

The motivation behind this error criterion may be appreciated by examining the Exclusive OR error (denoted $A \oplus B$) in the Chart I depicted in FIG. 4.

Compare the Exclusive OR pattern for the "c" and "o" in Chart I in FIG. 4 with the pattern for the pair of "e's" in Chart II in FIG. 5.

Note that in Chart I the Exclusive OR Error count for the pair "c" and "o" (23) is actually less than that in Chart II for the pair of "e's" (29) implying that by this error metric, "c" and "o" are "closer" than the pair of "e's" are to each other. However, the error pattern for the pair of "e's," which should be declared a match, is composed of sparsely distributed pixels, while the error pattern for the "o" and "c" shows a dense node of error pixels corresponding to the missing right segment of the "o." One way to quantify the density of such a "node" is to form a summation in which the local density of every black pixel is the sum of all the pixels in its $3 \times 3$ neighborhood if the pixel is 1, and $\phi$ if the pixel is $\phi$. The patterns above labelled "Weighted XOR Error" were calculated in this manner. Note that by this criterion, the associated counts indicate that the pair "c" and "o" are more separated (Count=131) than are the pair of "e's" (Count=73).

The isolated pixel error criterion

Chart III depicted in FIG. 6 shows the pattern formed by adding the A pattern to twice the B pattern. Therefore, a 1 indicates "A" only, a 2 indicates "B" only, and a 3 indicates both.

Based on the pattern A+2B, an isolated pixel is declared whenever a "2" touches nothing but other "2's," or a "1" touches nothing but other "1's." These isolated pixels are deemed serious errors because they indicate the presence of a structure in a pattern that has no counterpart in the other pattern. In contrast to the left patterns, consider the isolated pixel map for the pair of "e's" on the right. By the isolated pixel error alone, the pair of "e's" are identical, thus demonstrating good tolerance to variations in line thickness and noise. The isolated pixel error function has been found to give excellent matching performance while being very amenable to hardware implementation.

This can be accomplished by considering the two-dimensional local neighborhoods surrounding the picture element (pixel) in question. For the case of nine pixels in a $3 \times 3$ neighborhood, the elements may be numbered as

| 1 | 2 | 3 |
|---|---|---|
| 4 | 5 | 6 |
| 7 | 8 | 9 | with "5" denoting the central pixel.

In the linear array representing the two-dimensional pattern, the neighborhood around the central element (IDX) may be extracted as

NEIGHBOR(K)=A(IDX+OFFSET[K])

for

K=1, 2, 3, ..., 9 and

OFFSET[1]=-NCOL-1

OFFSET[2]=-NCOL

OFFSET[3]=NCOL+1

OFFSET[4]=-1

OFFSET[5]=$\phi$

OFFSET[6]=1

OFFSET[7]=NCOL-1

OFFSET[8]=NCOL

OFFSET[9]=NCOL+1

The vector from element 5 (the central pixel) to element K points in exactly the opposite direction to the vector from element 5 to element (10-K). The concept of vector polarity can be used to calculate errors for all nine translational offsets very efficiently.

The algorithm cycles through the pair of patterns of templates, one pixel at a time, and forms $3 \times 3$ neighborhoods from each. The data is then used to calculate nine errors, each of which represents a translational shift of one template with respect to the other. The nine errors are used to increment nine accumulators and when the cycle is complete, the accumulator containing the smallest number represents the degree of similarity between the two templates. The translational shift which gave rise to the smallest error is indicated by the accumulator giving the smallest sum. For example, an accumulator for neighbor "3" would represent the shift of the second pattern or template relative to the first pattern in the direction of neighbor 3 (upper right).

A program for implementing the method and apparatus according to the present invention is illustrated in Chart IV:

CHART IV

```
    IMPLICIT INTEGER (A-Z)
C   A(IDX) = 1ST TEMPLATE
C   B(IDX) = 2ND TEMPLATE
C   OFFSET(K) = OFFSETS TO ACCESS NEIGHBORS
C   ERROR(K) = ERROR FOR OFFSET INDEX K
C   ANEIGHBORS(K) = THE 9 NEIGHBORS IN THE "A"
    TEMPLATE
C   BNEIGHBORS(K) = THE 9 NEIGHBORS IN THE "B"
    TEMPLATE
```

CHART IV-continued

```
C*******INITIALIZE ACCUMULATORS
       DO 1φφ K = 1,9
1φφ    ERROR(K) = φ
C
C*******CYCLE THRU TEMPLATES, AVOIDING EDGES
       DO 2φφ IDX = NCOL+1, N-NCOL-1
C
C*******GET 9 NEIGHBORS FOR A AND B
       DO 12φ K = 1, 9
       ANEIGHBORS(K) = A(IDX + OFFSET(K))
       BNEIGHBORS(K) = B(IDX + OFFSET(1φ-K));
       OPPOSITE POLARITY
12φ    CONTINUE
C
C*******INCREMENT ERROR COUNTERS
       DO 15φ K = 1, 9
       ERROR(K) = ERROR(K) +
     . ANEIGHBORS(K) *NOT(OR(BNEIGHBORS)) +
     . BNEIGHBORS(K) *NOT(OR(ANEIGHBORS))
15φ    CONTINUE
2φφ    CONTINUE
C
where
       ARRAY(*)  is an array of 9 binary numbers
       NOT(*)    is the Boolean "not" function
       OR(*)     is the Boolean "or" function
```

Then NOT(OR(ANEIGHBORS))=1 if and only if all the ANEIGHBORS are zero. If any of the neighbors are 1, then the function is zero. Therefore, an error for the K-th translational offset occurs if and only if ANEIGHBORS(K) = 1
AND
        NOT(OR(BNEIGHBORS)) = 1
        (i.e. empty B neighborhood)
or the converse:
        BNEIGHBORS(K) = 1
AND
        NOT(OR(ANEIGHBORS)) = 1
        (i.e. empty A neighborhood)

The above is the contextual definition of an "isolated pixel," that is, a pixel which is a "1" in one pattern or template, but has no corresponding pixel which is in the state "1" within a distance of one element in the other template. This function has been found to give excellent matching performance while being very amenable to hardware implementation.

FIG. 1 depicts a schematic diagram of a high speed character matcher according to the present invention using an isolated pixel count for a 3×3 array, and where each character is represented by a 32×32 array of pixels.

In FIG. 1, a first unknown character ("U") to be matched is stored in character buffer or memory 10, typically a 128×8 bit memory by techniques known in the art. The character to be loaded in buffer 10 is under control of counter circuit 16. A known or candidate "C" character is stored in a similar character buffer 22.

To form the one-dimensional array for the respective characters from buffers 10, 22, the pixel data representing the first and second characters is latched through latches 12, 24, and shift registers 14, 26 and into shift registers 18, 28, respectively.

Shift registers 18, 28 are 67-bit shift registers which are tapped in order to form linear arrays representing the respective 3×3 arrays described above. For example, shift register 18 has taps at bits 1, 2, 3 and then the next 29 bits are untapped. The next three bits are tapped (which would correspond to bits 33, 34, 35 of register 18), and the next 29 bits are untapped, followed by three tapped bits (bits 65, 66, 67), thereby forming a linear array to correspond to the 3×3 array. Because each character is represented in a 32×32 bit array, two rows of pixel data from buffers 10 and 22 (32 bits per row) are required plus an additional three bits from the third row from the respective buffer to form the necessary 3×3 array.

When the candidate and unknown characters from buffers 10, 22 are loaded into shift registers 18, 28, respectively, the respective taps from registers 18, 28 are NORed in NOR gates 20, 30, respectively, to determine whether any of the pixels in the array of interest is in a first state (e.g., a "1"). If so, NOR gates 20, 30 will go low, or false.

The output of NOR gate 20 is an enable signal to AND gates 41–49, each of which receive respective inputs from taps 1–9 of register 28. Similarly, NOR gate 30 is connected as an enable input to AND gates 31–39, each of which are connected to receive respective taps 9, 8, . . . , 1 of register 18.

The outputs of AND gates 31–39 are ORed in respective OR gates 51–59 with the outputs of AND gates 49–41, respectively. The arrangement according to the present invention is arranged to utilize the concept of vector polarity described previously in order to calculate errors for all nine translational offsets very efficiently. For example, the output of gate 31 (bit 1 of register 18) is ORed in gate 51 with the output of gate 49 (bit 9 of register 28).

The outputs of OR gates 51–59 form an input to digital counters or accumulators 61–69, respectively. The smallest isolated pixel count is determined by the minimum selection logic 70, which compares the particular count in counters 61–69 with a predetermined threshold value and generates a "match" signal on bus 72 should the comparison of characters from buffers 10 and 22 form a favorable match.

FIG. 2 depicts a modification to the schematic diagram of FIG. 1 in order to implement the weighted error criterion.

The outputs of shift registers 18 and 28 are input to exclusive-OR gates 81–89, which receive the corresponding taps from shift registers 18, 28. For example, gate 81 receives the "1" taps from registers 18, 28.

The exclusive-OR outputs of gates 81–89 are input to decoding ROM 90. The output of ROM 90 is a 4-bit signal representing a decimal count between 0 and 9, which is the number of active gates 81–89. ROM 90 in turn is connected into adder 91 via 4-bit bus 93. Adder 91 adds the changing counts each cycle via latch circuit 92 in order to form on bus 94 a signal which represents the cleaned error count for each central pixel. The weighted error count for the remaining pixels would be generated in a similar fashion. However, for simplicity, only the generation of the weighted error count for the central pixel is shown in FIG. 2. To obtain the weighted error count for the remaining pixels, it is necessary to increase the size of either register 18 or 28 to 133 bits to obtain a 5×5 neighborhood, and increase the exclusive-OR array to 81 gates.

Referring now to FIG. 3, there is depicted therein a block diagram of a character matcher according to the present invention which utilizes the isolated error, weighted error, and raw error criteria described hereinabove.

In FIG. 3, the respective character from character buffers 110, 122 are loaded into shift registers 118, 128 in the same manner as for that described in conjunction with the isolated error criterion of FIG. 1.

The character matcher of FIG. 3 implements the isolated pixel criterion by generating in NOR gates 120, 130 the "empty neighborhood" signal for connection to 2-input AND arrays 140, 131 respectively. The outputs of array circuit 131, 140 are input to OR array circuit 150 which generates the isolated pixel error signals on bus 151 for connection to weighting array circuit 136.

In order to illustrate the generation of the weighted error signal, the pixels in the 5×5 neighborhood from register 128 on bus 123 are input to the EX-OR array 132 together with the corresponding center pixel and 3×3 neighborhood signals on bus 124 from register 118. The error signals generated by array 132 are output on bus 121 to the input of the decoding PROM array 180 which generates the weighted error count for each pixel from bus 124. The output signals from array 180 are output on bus 181 to the input of the weighting array circuit along with the isolated error signals from bus 151.

The output of register 118 on bus 124 is also input to the EX-OR array 133 together with the center pixel signal on bus 123 from register 128. Array 133 generates the raw error signal on bus 138 which is also input to weighting array circuit 136. Weighting array circuit 136 receives the three error signals on buses 138, 151, 181 and appropriately weights them so that the isolated errors are made more significant than the cleaned errors, which are in turn made more significant than the raw errors. For the case of binary-related weights, the weighting array consists merely of connections to the appropriate significant bit position. The output of array 136 on bus 187 is the combined error signals for each of the nine positional shifts which is input to the accumulator array 188. Accumulator array 188 totals up the error signals for each pixel for each of the nine positional shifts.

In one embodiment, the present weighting scheme penalizes isolated errors, cleaned errors and raw errors respectively with decreasing levels of severity. The 5×5 pixel arrangement allows the errors to be accumulated for each of the nine possible 1-pixel translational shifts without physically shifting the characters. At the completion of the pass through the character block, accumulator array 188 is scanned by comparator circuit 170 to find the minimum error count and determine if it is below an acceptable predetermined threshold determined by character size. Accumulator array 188 is connected to comparator circuit 170 via bus 139. If any of the accumulators are below the predetermined threshold, the unknown character is considered to be matched and a match signal is generated on bus 172. If not, the unknown character may be shifted in the direction of the lowest count, and the matching process repeated. This is accomplished by starting one shift register an appropriate number of shift clocks before the other.

Three types of errors have been described, and are listed below in order of increasing severity:
1. Conventional "exclusive-OR" or "raw" error.
2. Cleaned raw error which indicates dense nodes.
3. Pixels which are isolated relative to the opposite template.

The total error criterion can be calculated as:

ERROR=(WEIGHT1*RAW+WEIGHT2*-CLEANED+WEIGHT3*ISOLATED)

where

WEIGHT1<WEIGHT2<WEIGHT3

The calculated error is compared to a threshold in order to determine whether or not a match should be declared. The value of the threshold is a non-linear function of the symbol's blackcount, and is obtained via an empirically determined lookup table.

What is claimed is:

1. In a high speed character matching apparatus, the method comprising the steps of storing digital pixel data representing first and second characters, respectively, forming an array for each pixel of said first and second characters where each pixel of said first and second characters is the center element of said array surrounded by its nearest neighboring pixels, determining whether each center pixel is in a first state, determining whether any pixel in the corresponding array of said second character is in said first state or in a second state, different from said first state, and counting the number of pixels of said center pixel and said corresponding array when said pixels are in said first state.

2. High speed character matching apparatus comprising means for storing digital pixel data representing first and second characters, respectively, means for forming an array for each pixel of said first and second characters where each pixel is the center element of said array surrounded by the nearest neighboring pixels, means for determining whether each center pixel is in a first state, means for determining whether any pixel in the corresponding array of said second character is in said first state or in a second state, different from said first state, and means for summing the number of pixels of said center pixel and said corresponding array when said pixels are in said first state.

3. The apparatus of claim 2 including first and second memory means for storing the pixel data representing said first and second characters, respectively.

4. The apparatus of claim 3 including shift register means for forming an array for each of said pixels.

5. The apparatus of claim 4 including first logic means for determining whether each center pixel is in said first state.

6. The apparatus of claim 5 including second logic means for determining whether each pixel in the corresponding array is in said second state.

7. The apparatus of claim 6 including means for generating control signals representing the number of said pixels in said second state.

8. The apparatus of claim 7 including means for storing the number of said control signals.

9. The apparatus of claim 8 wherein said means for storing includes a plurality of accumulators corresponding to the number of elements in the array for storing a control count corresponding to the number of neighboring pixels in said second state.

10. The apparatus of claim 9 including logic means for comparing the control count in each of said digital counters with a predetermined threshold value to determine whether said first and second characters form a match.

11. In a character matcher, the method comprising the steps of storing digital pixel data representing first and second characters, respectively, forming an array for each pixel of said first and second characters where each pixel is the center element of said array surrounded by the nearest neighboring pixels, determining whether each center pixel is in a first state, determining whether all pixels in the corresponding array of said second characters are in said first state or in a second state, different from said first state, and summing the number of pixels of said center pixel and said corresponding array when said pixels are in said first state, and determining whether any of said center pixels of said first character are in a different state than the corresponding center pixel of said second character.

12. A high speed character matching apparatus comprising means for storing digital pixel data representing first and second characters, respectively, means for forming an array for each pixel of said first and second characters where each pixel is the center element of said array surrounded by its nearest neighboring pixels, means for determining whether each center pixel is in a first state, means for determining whether any pixel in the corresponding array of said second character is in said first state or in a second state, different from said first state, and means for summing the number of pixels of said center pixel and said corresponding array when said pixels are in said first state.

13. The apparatus of claim 12 further including means for determining whether any of said center pixels of said first character are in a different state than the corresponding center pixel of said second character.

* * * * *